(12) United States Patent
Subramanian

(10) Patent No.: US 12,337,812 B2
(45) Date of Patent: Jun. 24, 2025

(54) BRAKING TRAILERS IN A TRACTOR-TRAILER COMBINATION

(71) Applicant: Volvo Truck Corporation, Gothenburg (SE)

(72) Inventor: Chidambaram Subramanian, Greensboro, NC (US)

(73) Assignee: Volvo Truck Corporation, GØteborg (SE)

( * ) Notice: Subject to any disclaimer, the term of this patent is extended or adjusted under 35 U.S.C. 154(b) by 413 days.

(21) Appl. No.: 18/076,550

(22) Filed: Dec. 7, 2022

(65) Prior Publication Data

US 2024/0042974 A1 Feb. 8, 2024

Related U.S. Application Data

(60) Provisional application No. 63/394,431, filed on Aug. 2, 2022.

(51) Int. Cl.
*B60T 8/17* (2006.01)
*B60T 8/32* (2006.01)

(52) U.S. Cl.
CPC ............ *B60T 8/1708* (2013.01); *B60T 8/323* (2013.01); *B60T 2230/06* (2013.01)

(58) Field of Classification Search
CPC .... B60T 8/1701; B60T 8/1705; B60T 8/1708; B60T 8/1764; B60T 8/32; B60T 8/323; B60W 3/188; B60W 10/18
See application file for complete search history.

(56) References Cited

U.S. PATENT DOCUMENTS

| | | | |
|---|---|---|---|
| 5,050,938 A | 9/1991 | Brearley et al. | |
| 2013/0085649 A1* | 4/2013 | Matoy | B60T 8/1708 701/70 |
| 2013/0158801 A1* | 6/2013 | Tober | B60T 13/683 701/41 |
| 2019/0299946 A1 | 10/2019 | Miller, Jr. et al. | |
| 2020/0282965 A1* | 9/2020 | Pieronek | H04L 12/40 |
| 2021/0284109 A1 | 9/2021 | Brutt et al. | |
| 2023/0242121 A1* | 8/2023 | Salif | B60T 8/1764 701/70 |

OTHER PUBLICATIONS

Extended European Search Report for European Patent Application No. 22212263.2, mailed Aug. 17, 2023, 5 pages.

* cited by examiner

*Primary Examiner* — John Kwon
(74) *Attorney, Agent, or Firm* — Withrow & Terranova, PLLC

(57) ABSTRACT

A method for braking one or more trailers in a tractor-trailer combination. The method comprises establishing a maximum continuous brake pressure for trailer brakes of wheels of the one or more trailers of the tractor-trailer combination. The method further comprises establishing an on-off cycling frequency for pulsing of the brakes of the one or more trailers of the tractor-trailer combination at brake pressures above the maximum continuous brake pressure. The method further comprises establishing applying the brakes of the one or more trailers continuously at brake pressures up to the established maximum continuous brake pressure and by pulsing according to the established on-off cycling frequency at brake pressures above the established maximum continuous brake pressure.

15 Claims, 6 Drawing Sheets

BRAKING TRAILERS IN A TRACTOR-TRAILER COMBINATION

RELATED APPLICATIONS

The present application claims priority to U.S. Provisional Patent Application No. 63/394,431, filed on Aug. 2, 2022, and entitled "BRAKING TRAILERS IN A TRACTOR-TRAILER COMBINATION," which is incorporated herein by reference in its entirety.

TECHNICAL FIELD

The disclosure relates generally to handling deceleration of a vehicle. In particular aspects, the disclosure relates to braking trailers in a tractor-trailer combination. The disclosure can be applied in heavy-duty vehicles, such as trucks, buses, and construction equipment. Although the disclosure may be described with respect to a particular vehicle, the disclosure is not restricted to any particular vehicle.

BACKGROUND

For some tractor-trailer combinations, trailers are at least partly controlled by use of a Power Line Communication (PLC). This means that data is signaled to and from the trailers in the same wire that is supplying electrical power to the trailers. The data may be signaled by modulating a carrier signal providing electrical power in a wiring between the trailers and tractors.

When PLC is used, communication between the tractor and trailer is limited and thereby, the status of the trailer is unknown and/or uncertain. Due to the unknown or uncertain status, when an external brake request (XBR) is obtained, e.g., any of emergency braking, Cruise Control (CC), Adaptive Cruise Control (ACC), or a combination thereof, the tractor will apply brakes by use of a conservative approach.

In tractor-trailer combinations, when braking of the combination is desired, brakes on the trailers are then typically applied in a pulsed fashion, such as by being applied for 0.5 seconds, then released for 2.5 seconds, and so on according to this cycle, regardless of the pressure applied to the brakes. This is done to minimize the possibility of the trailer wheels locking up or loss of stability of the trailer or trailers.

Because the brakes of a trailer or trailers are typically only applied for a fraction of many braking operations, the brakes of a tractor of a tractor-trailer combination have to perform substantially more of the braking force than the brakes of the trailer or trailers. For example, where the brakes of the trailer are only applied 0.5 seconds and then released for 2.5 seconds, i.e. a ⅙ of the time, the brakes of the tractor will ordinarily be required to provide at least about ⅚ of the braking force. This often results in the brakes of the tractor being caused to perform braking for a total combination load that is greater than the load that the tractor brakes are designed to handle, and can lead to high temperatures at the brake pads and damage to the brakes. Additionally, because the length of time that the brakes are applied and released is not adjusted, the effectiveness of the braking operation can be compromised.

It is desirable to improve the manner in which trailer brakes are applied during a braking operation in a tractor-trailer combination.

SUMMARY

According to a first aspect of the disclosure, a method for braking one or more trailers in a tractor-trailer combination is provided.

The method comprises measuring or estimating a load of the one or more trailers. The method further comprises measuring a speed of the tractor-trailer combination. The method further comprises determining an understeer or oversteer gradient for the tractor-trailer combination.

The method further comprises establishing a maximum continuous brake pressure for trailer brakes of wheels of the one or more trailers of the tractor-trailer combination that can be continuously applied over a range of braking parameters without causing the wheels to lock up or the one or more trailers to lose stability. The range of braking parameters includes the load of the one or more trailers, the speed of the tractor-trailer combination, and the understeer or oversteer gradient for the tractor-trailer combination.

The method further comprises establishing an on-off cycling frequency for pulsing of the trailer brakes of the one or more trailers of the tractor-trailer combination at brake pressures above the maximum continuous brake pressure over the range of braking parameters without causing the wheels to lock up or the one or more trailers to lose stability.

The method further comprises applying the brakes of the one or more trailers continuously at brake pressures up to the established maximum continuous brake pressure and by pulsing according to the established on-off cycling frequency at brake pressures above the established maximum continuous brake pressure.

The first aspect of the disclosure may seek to improve the use of trailer brakes in the tractor-trailer combination. A technical benefit may include that the trailer brakes can be used more often than as they are applied constantly up to the maximum continuous brake pressure, and above the maximum continuous brake pressure they are applied in a pulsing manner using the established on-off cycling frequency.

Since the maximum continuous brake pressure is established based on the range of brake parameters, the trailer brakes of the one or more trailers is used more often than for legacy trailer brakes. This is since a constant braking of the trailers can be performed up to the maximum continuous brake pressure and no pulsation is necessary to ensure that the brakes of the trailers are not locking up or losing stability.

Since the on-off cycling frequency is established based on the range of brake parameters, the trailer brakes of the one or more trailers is used more often than for legacy trailer brakes where pulsation is performed conservatively as the range of brake parameters are not known and cannot be used to control the pulsation. This means that on-off frequency ensures an increased trailer brake usage while ensuring that the trailer brakes of the trailers will not lock up and that the one or more trailers will not lose stability.

In some examples, establishing the maximum continuous brake pressure and establishing the on-off cycling frequency is based on whether or not Anti-lock Braking System, ABS, is present or absent in the one or more trailers.

In this way, the on-off cycling frequency and the maximum continuous brake pressure can be more accurately established which allows an increased usage of the trailer brakes.

It should further be noted that when the one or more trailer brakes are applied, a respective ABS may be used for each respective trailer based on the applied brake pressure. For trailers with ABS, ABS may take priority over brake pressures established of examples herein.

In some examples, whether or not ABS is present or absent in the one or more trailers is established using a Power Line Communication, PLC, with the one or more trailers.

In this way, whether or not ABS is present can be automatically detected based on the PLC communication.

In some examples, the maximum continuous brake pressure and/or the on-off cycling frequency are established as a function of a number of trailers in the one or more trailers.

In this way, the on-off cycling frequency and the maximum continuous brake pressure can be more accurately established which allows an increased usage of the trailer brakes. For example, an increase in number of trailers may increase the maximum continuous brake pressure. Furthermore for the on-off cycling frequency, the on-time in the on-off cycling frequency may be decreased when the number of trailers are increased.

The on-off cycling frequency and the maximum continuous brake pressure may further depend on whether or not the one or more trailers have installed ABS or not. In some examples, a higher number of trailers, e.g., above a threshold, in the one or more trailers may lead to a higher risk of instability and/or brakes locking up, and for a lower number of trailers, e.g., below the threshold, there is a lower risk of instability and/or brakes locking up. Hence, the higher number of trailers may mean less continuous pressure, i.e. a lower maximum continuous brake pressure and/or longer off-durations of the on/off cycling frequency, than for the lower number of trailers.

Since ABS configurations takes priority over brake pressures established herein, more trailers with ABS in the one or more trailers, e.g., above an ABS threshold, may mean that there is a lower risk of instability and/or brakes locking up than when there is a lower number of trailers with ABS in the one or more trailers, e.g., below the ABS threshold. Hence, higher number of trailers with ABS, e.g., above the ABS threshold, may mean a higher continuous pressure i.e. a higher maximum continuous brake pressure and/or longer on-durations of the on/off cycling frequency, compared to a lower number of trailers with ABS, e.g., below the ABS threshold.

In some examples, the method further comprises estimating the number of trailers in the one or more trailers based on an obtained plurality of PLC signals transmitted via PLC signalling from each one of the one or more trailers.

In this way, the number of trailers can be detected in an automatic manner, and thereby the maximum continuous brake pressure and the on-off cycling frequency can be established accurately for ensuring an increased trailer usage.

In some examples, estimating the number of trailers is performed by using a machine learning model and the obtained plurality of PLC signals. In these examples, the machine learning model is trained on a plurality of different numbers of trailers signalling using PLC.

In this way, the number of trailers can be estimated automatically, thereby the maximum continuous brake pressure and the on-off cycling frequency can be established accurately for ensuring an increased trailer usage.

In some examples, establishing the maximum continuous brake pressure and establishing the on-off cycling frequency comprises producing the maximum continuous brake pressure and the on-off cycling frequency based on a maximum allowed brake pressure that can be applied prior to pulsing, and based on a maximum allowed pulse.

In this way, the maximum continuous brake pressure and the on-off cycling frequency will be saturated to be within limits of the maximum allowed brake pressure and the maximum allowed pulse.

In some examples, the maximum allowed brake pressure and the maximum allowed pulse is established by the use of one or more datamaps. In these examples, at least a number of trailers of the one or more trailers is used as input.

In this way, the number of trailers limits the maximum allowed brake pressure and the maximum allowed pulse, and the maximum continuous brake pressure and the on-off cycling frequency can be accurately established up until these limits. This ensures that the brakes of the one or more trailers will not lock up and/or that the one or more trailers will not lose stability by swaying out.

In some examples, the maximum allowed brake pressure and the maximum allowed pulse are further established based on whether the one or more trailers have ABS or not. In this way, the limits of the maximum allowed brake pressure and the maximum allowed pulse can be established more accurately. For example, when the one or more trailers has an increased number of trailers, e.g., above a threshold, with ABS installed, the maximum allowed brake pressure and the maximum allowed pulse can be increased compared to when the one or more trailers does not have ABS. An increased maximum allowed pulse may mean an increased maximum "on"-time when pulsing the brake pressure.

In some examples, applying the trailer brakes of the one or more trailers continuously at brake pressures up to the established maximum continuous brake pressure and pulsing according to the established on-off cycling frequency at brake pressures above the established maximum continuous brake pressure are based on the measured or estimated load of the one or more trailers, the measured speed of the tractor-trailer combination, and the determined understeer or oversteer gradient for the tractor-trailer combination. In other words, applying the trailer brakes of the one or more trailers continuously at brake pressures up to the established maximum continuous brake pressure and pulsing according to the established on-off cycling frequency at brake pressures above the established maximum continuous brake pressure are based at least on the range of braking parameters.

In this way, the on-off cycling frequency and the maximum continuous brake pressure can be more accurately established which allows an increased usage of the trailer brakes. For example, an increase in load, e.g., a load loaded on the one or more trailer and/or a load exerted by the one or more trailers to a ground surface, may lead to an increase in the maximum continuous brake pressure, an increase in speed may decrease an on-time of the on-off cycling frequency, i.e. how long the trailer brakes of the one or more trailers is to be applied, and the understeer or oversteer gradient may decrease the maximum continuous brake pressure and/or increase an on-time of the on-off cycling frequency when the gradient indicate an oversteer or understeer by more than a threshold.

According to a second aspect of the disclosure, a system for braking one or more trailers in a tractor-trailer combination is provided. The system comprises a brake Electronic Control Unit (ECU) comprising a database. The database contains a maximum continuous brake pressure established for brakes of wheels of the one or more trailers of the tractor-trailer combination that can be continuously applied over a range of braking parameters without causing the wheels to lock up or the one or more trailers to lose stability. The database further contains an on-off cycling frequency established for pulsing of the brakes of the one or more trailers of the tractor-trailer combination at brake pressures above the maximum continuous brake pressure over the range of braking parameters without causing the wheels to lock up or the one or more trailers to lose stability. The range of braking parameters includes load of the one or more trailers, speed of the tractor-trailer combination, and an understeer or oversteer gradient for the tractor-trailer combination. The system comprises means for measuring or estimating a load of the one or more trailers. The system comprises means for measuring speed of the tractor-trailer combination. The system comprises means for determining an understeer or oversteer gradient for the tractor-trailer combination. The system comprises trailer brakes of the one or more trailers. The brake ECU is arranged to control application of the trailer brakes of the one or more trailers continuously at brake pressures up to the established maximum continuous brake pressure and by pulsing according to the established on-off cycling frequency at brake pressures above the established maximum continuous brake pressure.

The second aspect of the disclosure may seek to improve the use of trailer brakes in the tractor-trailer combination. A technical benefit may include that the trailer brakes can be used more often than as they are applied constantly up to the maximum continuous brake pressure, and above the maximum continuous brake pressure they are applied in a pulsing manner using the established on-off cycling frequency.

The system of the second aspect may be configured to perform the method according to the first aspect.

Advantages and effects of the system of the second aspect are largely analogous to the advantages and effects of the method of the first aspect. Further, all embodiments of the system of the second aspect are applicable to and combinable with all embodiments of the method of the first aspect, and vice versa.

According to a third aspect of the disclosure, a computer program product is provided. The computer program product comprises program code for performing, when executed by the processor device, the method of the first aspect.

According to a fourth aspect of the disclosure, a non-transitory computer-readable storage medium provided. The non-transitory computer-readable storage medium comprises instructions, which when executed by the processor device, cause the processor device to perform the method of the first aspect.

Advantages and effects of the third and fourth aspects are largely analogous to the advantages and effects of the method of the first aspect. Further, all embodiments of the third and fourth aspects are applicable to and combinable with all embodiments of the method of the first aspect, and vice versa.

For the above aspects, the trailer brakes of the one or more trailers may be applied in response to receiving an XBR, e.g., from a control unit controlling a CC mode and/or an ACC mode of the vehicle, due to an emergency braking, autonomous vehicle braking control, or a combination thereof. While XBR may be a most common scenario, manual braking as applied from a driver may also use any of the examples or embodiments herein.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
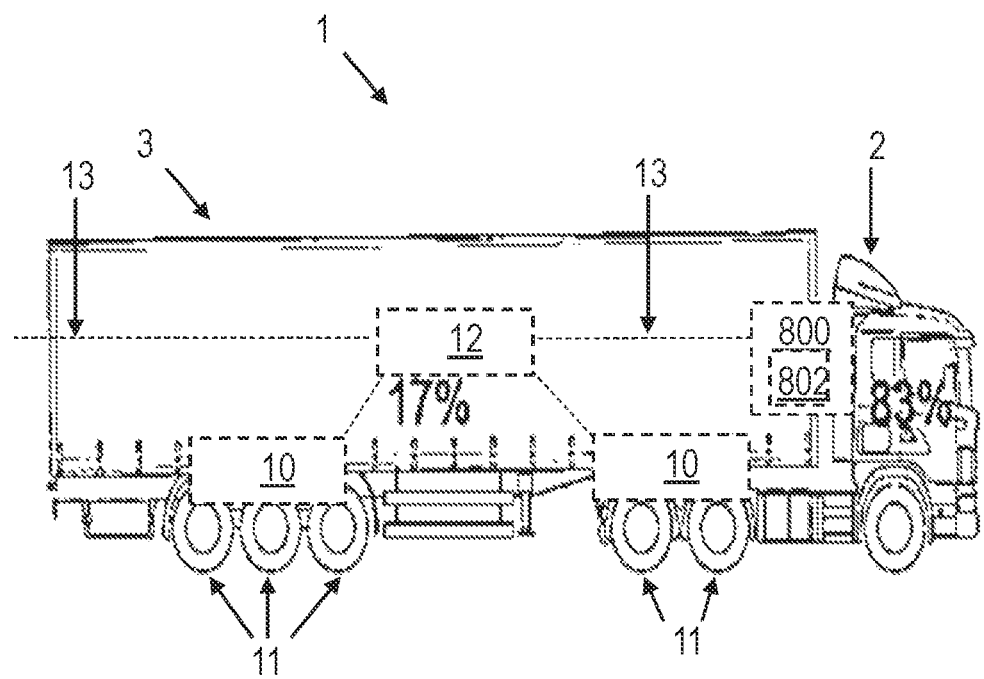
FIG. 1 illustrates an exemplary trailer-tractor combination according to one example.

FIG. 1 is an exemplary trailer-tractor combination 1 according to one example. The trailer-tractor combination 1 comprises a tractor 2 and one or more trailers 3.

While FIG. 1 only depicts one trailer, any multiple number of trailers are also possible and can be part of embodiments herein, e.g., the trailer-tractor combination 1 may comprise two or three trailers pulled by the tractor 2.

The trailer-tractor combination 1 comprises trailer brakes 10 for each of the one or more trailers 3. The trailer brakes 10 are arranged to brake one or more respective trailer wheels 11.

Embodiments herein may be performed at least partly by a system 800, and in particular a brake ECU 802 comprised therein. The brake ECU 802 may be a processor device. The system 800 may be any suitable system such as a computer system or a control system. The system 800 may be comprised in the trailer-tractor combination 1, or may be at a remote location communicatively coupled to the trailer-tractor combination 1, e.g., comprised in a server or control station which may be arranged to remotely control the trailer-tractor combination 1. The system 800 and/or the brake ECU 802 comprised therein may be able to control the trailer brakes 10 of the one or more trailers 3, directly or indirectly via communication with one or more brake control units 12, e.g., of each respective trailer in the one or more trailers 3. The respective one or more brake control units 12 may be arranged to control the trailer brakes 10, e.g., by applying a respective brake pressure to the respective trailer brakes 10. In some examples, there is a pneumatic control pressure line from the tractor 2 to all trailers in the one or more trailers 3, one by one. The control line pressure on the tractor 2 may have a pressure control valve which may modulate the brake pressures for each respective trailer in the one or more trailers 3.

The respective one or more brake control units 12 may be powered using a powerline 13, e.g., one for all trailers in the one or more trailers 3. The one or more brake control units 12 may be controlled by the brake ECU 802 directly or indirectly by signalling over the powerline 13. The one or more brake control units 12 and the brake ECU 802 may communicate, e.g., sending and receiving data, using signalling over the powerline 13, e.g., by modulating a pulse or wave over the powerline 13 and/or supplying a certain current and/or voltage on the powerline 13.

Figure 2:
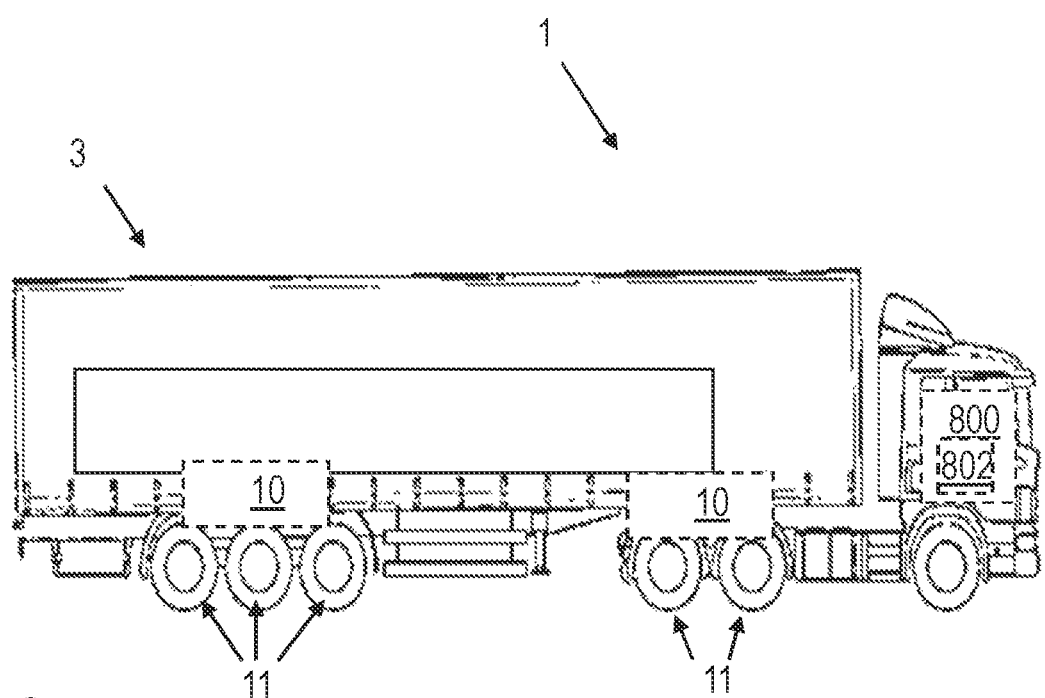
FIG. 2 illustrates another view of the trailer-tractor combination 1 of FIG. 1, according to another example.

FIG. 2 is another view of the trailer-tractor combination 1 shown in FIG. 1, according to another example. FIG. 2 illustrates the system 800. The system 800 is configured to brake the one or more trailers 3 using the trailer brakes 10. The one or more trailers 3 is comprised in the trailer-tractor combination 1. The system 800 comprises the brake ECU 802. The brake ECU 802 comprises a database. The database contains a maximum continuous brake pressure established for brakes 10 of wheels 11 of the one or more trailers 3 of the tractor-trailer combination 1 that can be continuously applied over a range of braking parameters without causing the wheels 11 to lock up or the one or more trailers 3 to lose stability. The database further contains an on-off cycling frequency established for pulsing of the brakes 10 of the one or more trailers 3 of the tractor-trailer combination 1 at brake pressures above the maximum continuous brake pressure over the range of braking parameters without causing the wheels 11 to lock up or the one or more trailers 3 to lose stability. The range of braking parameters includes load of the one or more trailers 3, speed of the tractor-trailer combination 1, and an understeer or oversteer gradient for the tractor-trailer combination 1.

The database may be represented by any suitable computer-readable storage medium or storage device. The established on-off cycling frequency established and maximum continuous brake pressure contained in the database may be established by using any of the embodiments or examples herein.

The system 800 further comprises means for measuring or estimating a load of the one or more trailers 3.

The system 800 further comprises means for measuring speed of the tractor-trailer combination 1.

The system 800 further comprises means for determining an understeer or oversteer gradient for the tractor-trailer combination 1.

The system 800 further comprises the brakes 10 of the one or more trailers 3. The brake ECU 802 is arranged to control application of the brakes 10 of the one or more trailers 3 continuously at brake pressures up to the established maximum continuous brake pressure and by pulsing according to the established on-off cycling frequency at brake pressures above the established maximum continuous brake pressure.

Figure 3:
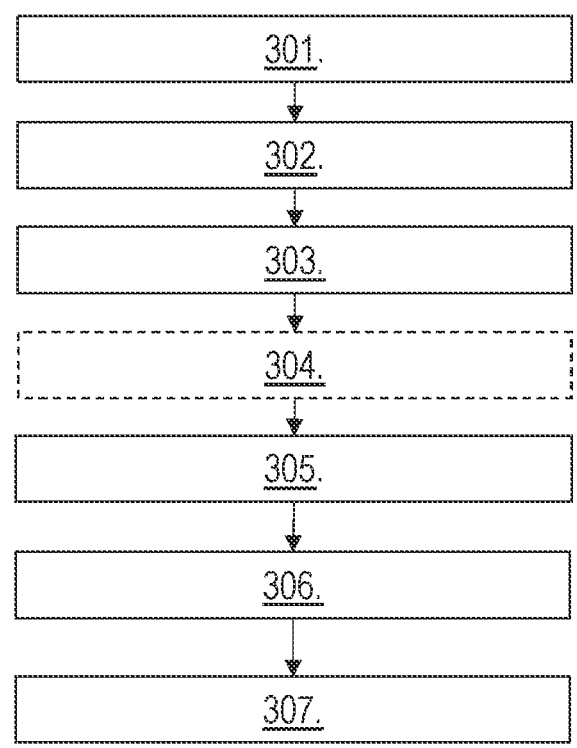
FIG. 3 illustrates a flow chart of an exemplary method.

FIG. 3 is a flow chart of an exemplary method for braking one or more trailers 3 in a tractor-trailer combination 1. The method may for example be performed by the system 800 and/or the brake ECU 802. The method may comprise one or more out of the following actions, which actions can be taken in any suitable order.

Action 301.

The method comprises, measuring or estimating a load of the one or more trailers 3. The load of the one or more trailers 3 may comprise a load, e.g., a weight, loaded on the one or more trailer and/or may comprise a load exerted by the one or more trailers 3 to a ground surface, e.g., on one or more axles of each trailer in the one or more trailers 3. The load of the one or more trailers 3 may be individual for each trailer in the one or more trailers 3 or may be a total load for the one or more trailers 3.

Measuring or estimating a load of the one or more trailers 3 may be performed in many different manners which can be performed in combination. For example, measuring or estimating a load of the one or more trailers may comprise:

measuring or estimating the load of the one or more trailers 3 by obtaining a manual input of whether or not any one or more out of the one or more trailers 3 are loaded, and e.g., if so, an indication of the weight of the load, measuring or estimating the load of the one or more trailers 3 by utilizing one or more sensors comprised in any one or more out of the one or more trailers 3, e.g., suspension sensors mounted on axles of a respective trailer, measuring or estimating the load of the one or more trailers 3 by monitoring the torque utilized, and based on a predefined or obtained weight of the tractor 2, and based on an obtained acceleration of the tractor-trailer combination 1.

In some example embodiments, measuring or estimating the load of the one or more trailers 3 may comprise measuring or estimating the load of a first trailer in the one or more trailers 3 and estimating at least one second trailer in the one or more trailers 3 to have the same load as the first trailer.

Action 302.

The method comprises, measuring or estimating a speed of the tractor-trailer combination 1. Measuring or estimating a speed of the tractor-trailer combination 1 may comprise any one or more out of:

obtaining a current speed of the tractor-trailer combination 1 from a speedometer, state estimations using a Wheel Speed Sensor (WSS), state estimations using an Inertial Measurement Unit (IMU), and state estimations using Global Positioning System (GPS) and/or Global Navigation Satellite System (GNSS).

Action 303.

The method comprises, determining an understeer or oversteer gradient for the tractor-trailer combination 1. Alternatively, instead of determining the understeer or oversteer gradient, it may be sufficient to obtain any suitable indication of an understeer or oversteer of the tractor-trailer combination 1.

An oversteer or understeer gradient as used herein may mean a derivative of one or more front wheels steer angle, e.g., average steer angle for a predefined period of time, with respect to a lateral acceleration imposed to the tractor-trailer combination 1, e.g., at the center of gravity of the tractor 1 or tractor-trailer combination 1. The one or more front wheels may be e.g., one or more wheels on a front axle of the tractor 2, the front axle being in the front of the tractor 2 with respect to a driving direction of the tractor 2.

In other words, the oversteer or understeer gradient may be any suitable indication of a steering wheel angle of the one or more front wheels in relation to a lateral acceleration of the tractor-trailer combination 1.

In some examples, an understeer is, if the yaw rate of the tractor-trailer combination 1 is lesser than a desired yaw rate, e.g., an absolute yaw rate and ignoring sign convention for clockwise and anticlockwise, In some examples, an oversteer is, if the yaw rate of the tractor-trailer combination 1 is greater than the desired yaw rate, e.g., an absolute yaw rate and ignoring the sign convention for clockwise and anticlockwise, In some examples, the desired yaw rate is when the tractor-trailer combination 1 has no side slip angle. This means that the driving direction of the tractor-trailer combination 1 is in a desired driving direction.

As an example, similar to the side slip angle on tires, if a front wheel loses grip and ploughs, it is an understeer. If the rear loses grip and swings out, it is an oversteer.

Determining the oversteer or understeer gradient may comprise measuring or estimating the oversteer or understeer gradient by any one or more out of: using the desired yaw rate and a measured yaw rate. The desired yaw rate may be estimated through a wheelbase of the tractor-trailer combination 1, a steering wheel angle, and a vehicle speed of the tractor-trailer combination 1.

Action 304.

In some example embodiments, the method further comprises estimating the number of trailers in the one or more trailers 3 based on an obtained plurality of PLC signals transmitted via PLC signalling from each one of the one or more trailers 3.

In other words, estimating the number of trailers in the one or more trailers 3 may comprise obtaining a plurality of PLC signals transmitted via PLC signalling from each one of the one or more trailers 3. The PLC signals may be signaled from a respective control unit 12 of each respective trailer, e.g., by modulating power on the powerline 13, e.g. Alternating Current (AC) or Direct Current (DC).

The PLC signalling may be any suitable signalling made over the powerline 13.

Each trailer may for example perform signalling over the powerline 13, continuously, periodically or based on an event. The signalling may be indicative of any one or more signalling parameters such as any one or more out of:
- an identifier of a respective trailer,
- an absence or presence of ABS,
- a configuration of brake parameters,
- a configuration of each respective brake control unit 12,
- a type of the respective trailer, and
- a load of the respective trailer.

Obtaining the plurality of PLC signals may comprise listening on the powerline 13, and identifying the one or more signals made over the powerline 13.

As an example, when a plurality of trailers communicate using PLC, many signals may be sent simultaneously over the powerline 13, which, in addition to the normal modulation necessary for electrical power, e.g., AC or DC, on the powerline 13, may cause what appears to be a random noise due the plurality of PLC signals mixing modulation on the powerline 13. However, while the plurality of PLC signals may appear random, the signals will follow a certain characteristics and/or pattern, e.g., defined by the number of trailers communicating, and/or the types of the one or more trailers 3.

In other words, estimating the number of trailers in the one or more trailers 3 based on the obtained plurality of PLC signals transmitted via the PLC signalling from each one of the one or more trailers 3 may comprise estimating the number of trailers based on a predefined model and/or heuristics by comparing the obtained plurality of PLC signals.

The plurality of PLC signals may be obtained over a predefined time period, e.g., defined by the model or heuristics. In some example embodiments, multiple different time periods or measuring events may be performed to ensure that a correct number of trailers is estimated.

In some example embodiments, estimating the number of trailers is performed by using a machine learning model and the obtained plurality of PLC signals. The PLC signals may be achieved continuously, periodically, or under a predefined time period. The machine learning model is trained on a plurality of different numbers of trailers signalling using PLC. The machine learning model may be trained using any suitable statistical model, e.g., a neural network by inputting training PLC signalling and a corresponding number of trailers performing said training PLC signalling.

Furthermore, when estimating the number of trailers in the one or more trailers 3 based on the obtained plurality of PLC signals, any one or more out of the above-mentioned signalling parameters may be estimated for the one or more trailers 3, e.g., whether or not the one or more trailers 3 have an absence or presence of ABS and/or a number of trailers in the one or more trailers 3 that have ABS installed.

Estimating the number of trailers in the one or more trailers 3 may further comprise estimating a confidence in the estimated number of trailers and/or a confidence in the estimated above-mentioned signalling parameters such as the absence or presence of ABS.

Action 305.

The method comprises, establishing a maximum continuous brake pressure for the trailer brakes 10 of the wheels 11 of the one or more trailers 3 of the tractor-trailer combination 1. The maximum continuous brake pressure is a brake pressure that can be continuously applied over a range of braking parameters without causing the wheels 11 to lock up or the one or more trailers 3 to lose stability.

The range of braking parameters includes the measured or estimated load of the one or more trailers 3, the measured or estimated speed of the tractor-trailer combination 1, and the determined understeer or oversteer gradient for the tractor-trailer combination 1, e.g., as in actions 301-303. The load of the one or more trailers 3 may comprise a load, e.g., a weight, loaded on the one or more trailer and/or may comprise a load exerted by the one or more trailers 3 to a ground surface, e.g., on one or more axles of each trailer in the one or more trailers 3. The load of the one or more trailers 3 may be individual for each trailer in the one or more trailers 3 or may be a total load for the one or more trailers 3.

In some example embodiments, establishing the maximum continuous brake pressure is based on whether or not ABS is present or absent in the one or more trailers 3.

In some example embodiments, whether or not ABS is present or absent in the one or more trailers 3 is established using a Power Line Communication, PLC, with the one or more trailers 3. Whether or not ABS is present or absent in the one or more trailers 3 may be estimated as in action 304 based on the communication of the signalling parameters over the powerline 13.

As an example, when ABS is present in the one or more trailers 3 or there is an increased presence of ABS in the one or more trailers, the established maximum continuous brake pressure can be decreased. This is since brakes applies brake pressures beyond an ABS pressure limit and thus there may be an increased risk of instability or brakes locking up.

In some example embodiments, establishing the maximum continuous brake pressure comprises producing the maximum continuous brake pressure based on a maximum allowed brake pressure that can be applied prior to pulsing. The maximum allowed brake pressure may be a maximum brake pressure used for saturation, i.e. an upper limit or a constraint, for when establishing the maximum continuous brake pressure.

In some example embodiments, the maximum allowed brake pressure is established by the use of a first datamap. The first datamap may be a predefined data structure, such as a lookup table, for mapping the maximum allowed brake pressure based on one or more inputs. The one or more inputs comprises at least the number of trailers of the one or more trailers 3 and optionally whether the one or more trailers 3 have ABS or not, e.g., a number of trailers in the one or more trailers 3 that have ABS present.

In other words, based on the number of trailers in the one or more trailers 3, and optionally whether they have ABS installed or not, the maximum allowed brake pressure is established to serve as an upper limit for the establishment of the maximum continuous brake pressure.

The first datamap may be comprised in the system 800, e.g., as part of the database stored in the system 800.

Action 306.

The method comprises, establishing an on-off cycling frequency for pulsing of the brakes 10 of the one or more trailers 3 of the tractor-trailer combination 1 at brake pressures above the maximum continuous brake pressure, over the range of braking parameters without causing the wheels 11 to lock up or the one or more trailers 3 to lose stability.

The on-off cycling frequency may be a frequency of switching between indicating to the trailer brakes 10 of the one or more trailers 3, to supply a brake pressure, e.g., by signalling the brake control units 12 over the powerline 13. The brake pressure, when applied, may be higher than the established maximum continuous brake pressure. Such high brake pressure which cannot be sustained for more than a period of time without risking locking up the wheels 11, therefore the brake pressure need to be pulsated on and off repeatedly using the on-off cycling frequency. Applying or indicating to apply brake pressure may be referred to as an on-state, and not applying or indicating to not apply brake pressure may be referred to as an off-state The on-off cycling frequency may define any one out of:
- a frequency between switching from the on-state and the off-state,
- a frequency of initiating an on-state,
- a frequency of initiating an off-state,
- a duration of an on-state, and
- a duration of an off-state.

While the above frequencies are typically the same or associated, they may differ slightly as the duration of the on-state and the duration of the off-state may be different durations.

In some example embodiments, establishing the on-off cycling frequency is based on whether or not ABS is present or absent in the one or more trailers 3.

In some example embodiments, whether or not ABS is present or absent in the one or more trailers 3 is established using a PLC with the one or more trailers 3. Whether or not ABS is present or absent in the one or more trailers 3 may be estimated as in action 304 based on the communication of the signalling parameters over the powerline 13.

As an example, when ABS is present in the one or more trailers 3 or there is an increased presence of ABS in the one or more trailers 3, the on-off frequency can be modified for the trailers with ABS, such that any one or more out of:
- a frequency in switching between on and off states can be reduced,
- an on-duration can be increased, and
- an off-duration can be decreased.

This is since this ensures that the trailer brakes 10 are used more, and when ABS is more prevalent, there is less risk of the trailer brakes 10 locking up.

In some example embodiments, the on-off cycling frequency is established as a function of a number of trailers in the one or more trailers 3.

In some example embodiments, establishing the on-off cycling frequency comprises producing the on-off cycling frequency based on a maximum allowed pulse.

The maximum allowed pulse may be a pulse frequency constraint used for saturation for when establishing the on-off cycling frequency, e.g., for limiting a lowest and/or highest frequency and/or for limiting longest and/or shortest durations of on/off states. The maximum allowed pulse may be a maximum or minimum allowable cycling frequency, e.g., for pulsating the trailer brakes 10.

In some example embodiments, the maximum allowed pulse is established by the use of a second datamap. The second datamap may be a predefined data structure, such as a lookup table, for mapping the maximum allowed pulse based on one or more inputs. The one or more inputs comprises at least the number of trailers of the one or more trailers 3 and optionally whether the one or more trailers 3 have ABS or not, e.g., a number of trailers in the one or more trailers 3 that have ABS present.

The second datamap may be the same as the first datamap, i.e. the first datamap of action 305 may be used to establish both the maximum allowed pulse and the maximum continuous brake pressure using the same input of at least the number of trailers of the one or more trailers 3 and optionally whether the one or more trailers 3 have ABS or not.

In other words, based on the number of trailers in the one or more trailers 3, and optionally whether they have ABS or not, the maximum allowed pulse is established to serve as a constraint for limiting the establishment of the on-off cycling frequency. For example, the maximum allowed pulse may limit the frequency and/or duration of the on-state such as to ensure that the trailer brakes 10 does not lock up and that the tractor-trailer combination 1 does not lose stability.

The second datamap may be comprised in the system 800, e.g., as part of the database stored in the system 800.

In some example embodiments, actions 305 and 306 are performed in combination, e.g., to establish both the on-off cycling frequency for pulsing of the brakes 10 and the maximum continuous brake pressure for brakes 10 as one joint action.

Action 307.

The method comprises, applying the brakes 10 of the one or more trailers 3 continuously at brake pressures up to the established maximum continuous brake pressure and by pulsing according to the established on-off cycling frequency at brake pressures above the established maximum continuous brake pressure, e.g., as established in actions 305-306.

Applying may be performed based on a requested brake pressure, e.g., from an XBR, wherein the brake pressure is modified to be constantly applied to the trailer brakes 10 up to the established maximum continuous brake pressure and, when above the established maximum continuous brake pressure, applied to the trailer brakes 10 in a pulsating manner according to the established on-off cycling frequency.

In some example embodiments, applying the brakes 10 of the one or more trailers 3 continuously at brake pressures up to the established maximum continuous brake pressure and pulsing according to the established on-off cycling frequency at brake pressures above the established maximum continuous brake pressure are based on the measured or estimated load of the one or more trailers 3, the measured speed of the tractor-trailer combination 1, and the determined understeer or oversteer gradient for the tractor-trailer combination 1. This means that the trailer brakes 10 will be applied differently based on the on the measured or estimated load of the one or more trailers 3, the measured or estimated speed of the tractor-trailer combination 1, and the determined understeer or oversteer gradient for the tractor-trailer combination 1. This is since depending on the measured or estimated load of the one or more trailers 3, the measured or estimated speed of the tractor-trailer combination 1, and the determined understeer or oversteer gradient for the tractor-trailer combination 1, the brake pressure will change from a constant applied brake pressure to a pulsating brake pressure at different thresholds, and the pulsation of the trailer brakes 10 will be different based on the measured or estimated load of the one or more trailers 3, the measured or estimated speed of the tractor-trailer combination 1, and the determined understeer or oversteer gradient for the tractor-trailer combination 1.

Applying the brakes 10 of the one or more trailers 3 may be performed in response to receiving an XBR, e.g., from other ECUs in the tractor-trailer combination 1, such as from any of: an Advanced Driver-Assistance System (ADAS) ECU, an Engine ECU, a vehicle master controller, etc.

The XBR may be a brake request for:
controlling a CC/ACC mode of the vehicle,
initiating an emergency braking,
autonomous vehicle braking control, e.g., when the trailer-tractor combination 1 is at least partly autonomous,
or a combination thereof.

While XBR may be a most common scenario for when to apply the brakes of the one or more trailers 3, manual braking as applied from a driver may also use any of the examples or embodiments herein, e.g., if explicitly set to be safe by a driver or user.

Figure 4:
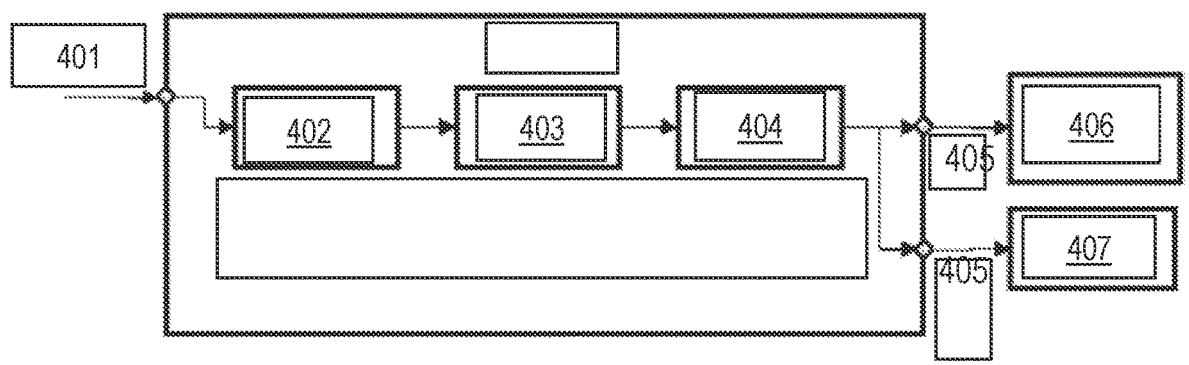
FIG. 4 illustrates a flow chart of exemplary embodiments herein.

FIG. 4 illustrates an example scenario of embodiments herein. FIG. 4 schematically shows the brake ECU 802 and tractor and trailer brake solenoids. When braking of the tractor-trailer combination 1 is desired, an XBR is sent 401 to the brake ECU 802. The sent XBR may trigger any one or more out of the actions 301-307 above.

The brake ECU 802 may estimate 402 a required deceleration for the tractor-trailer combination's axles based on one or more first parameters e.g., as part of the range of braking parameters including load, speed, and configuration of the combination.

The configuration may for example comprise any one or more out of:
the number of trailers of the one or more trailers 3,
whether or not ABS is present in the trailers of the one or more trailers 3, and
the type of trailers of the one or more trailers 3.

The brake ECU 802 may then estimate 403 a required torque to perform the required deceleration based on one or more second parameters e.g., including tire radius and brake factor, and, in an open loop system. The one or more second parameters may or may not be part of the range of braking parameters.

The brake ECU 802 may then estimate 404 a required brake pressure based on one or more predetermined pneumatic response parameters e.g., including a pressure gradient and a pressure delay. The one or more predetermined pneumatic response parameters may or may not be part of the range of braking parameters.

The brake ECU 802 may then send 405 DO signals to the tractor solenoids 406 to apply the brakes of the tractor and to the trailer solenoids 407 to apply the brakes 10 of the one or more trailers 3 based on the estimated required deceleration, estimated required torque, and estimated required brake pressure. DO signals as user herein means a Digital Output to open the respective solenoids 406, 407, or to close the respective solenoids 406, 407.

In embodiments herein, the sending 405 of DO signals to the trailer solenoids 407 to apply the brakes 10 of the one or more trailers 3 may be controlled by action 307 above.

Figure 5:
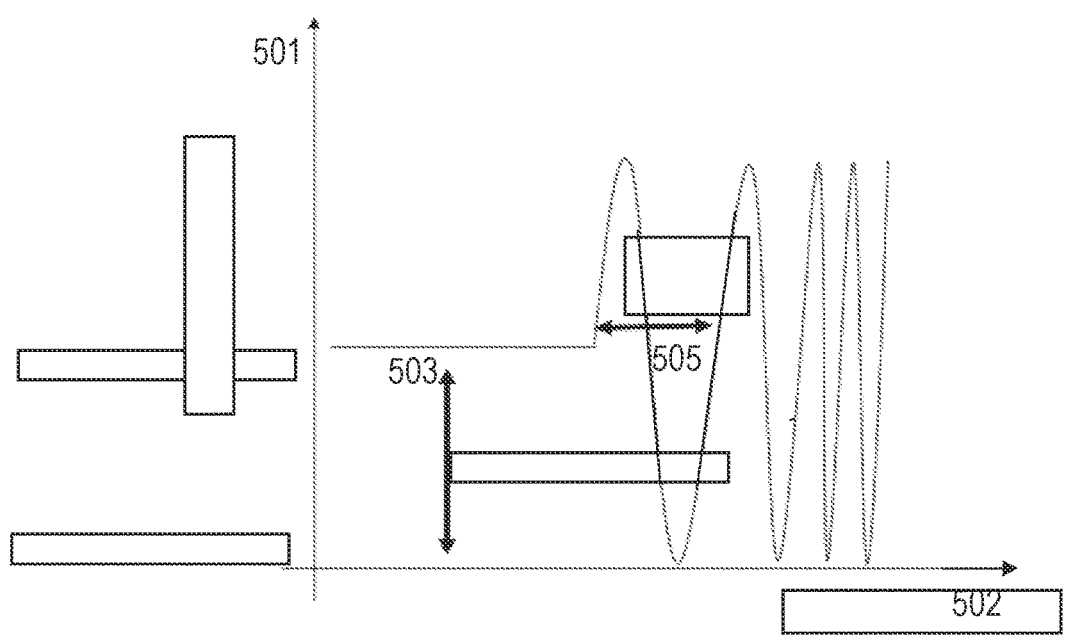
FIG. 5 illustrates an example scenario of exemplary embodiments herein.

FIG. 5 illustrates an example scenario of embodiments herein. FIG. 5 may illustrate a graph of pressure versus time during a braking operation according to an aspect of the present invention as will be explained.

The Y-axis 501 may represent a trailer pressure, e.g., in a number of Bar, to be applied to the trailer brakes 10, e.g., by communicating the trailer pressure using PLC signalling to the brake control units 12. The X-axis 502 may be time, e.g. in seconds.

In the example scenario, a no pulse threshold 503 is illustrated which represents the maximum continuous brake pressure and/or the maximum allowed brake pressure, e.g., as established in action 305. Up to the no pulse threshold 503, the trailer brakes 10 may be applied using a constant brake pressure. When a brake pressure to be applied, e.g., as in action 307, and the brake pressure is above the no pulse threshold 503, the trailer brakes 10 may need to be pulsated to ensure that the trailer brakes 10 do not lock up and/or to ensure stability of tractor-trailer combination 1, as illustrated as a pulse wave 505. The pulsation of the pulse wave of the brake pressure may be controlled by the on-off cycling frequency and/or the maximum allowed pulse, e.g., as established in action 306. The pulsation of the pulse wave 505 may have an on-state when the brake pressure is to be applied to the trailer brakes 10 and an off-state when the brake pressure is not applied to the trailer brakes 10. The pulsation of the pulse wave 505 may define a frequency of switching between the on-state and the off-state, or alternatively frequencies of when to initiate on-states and/or when to initiate off-states. Any of the frequencies may be part of the on-off cycling frequency as established in action 307. Furthermore, the pulsation of the pulse wave 505 may define a duration for each on-state and/or for each off-state, e.g., as part of the on-off cycling frequency as established in action 307.

Figure 6:
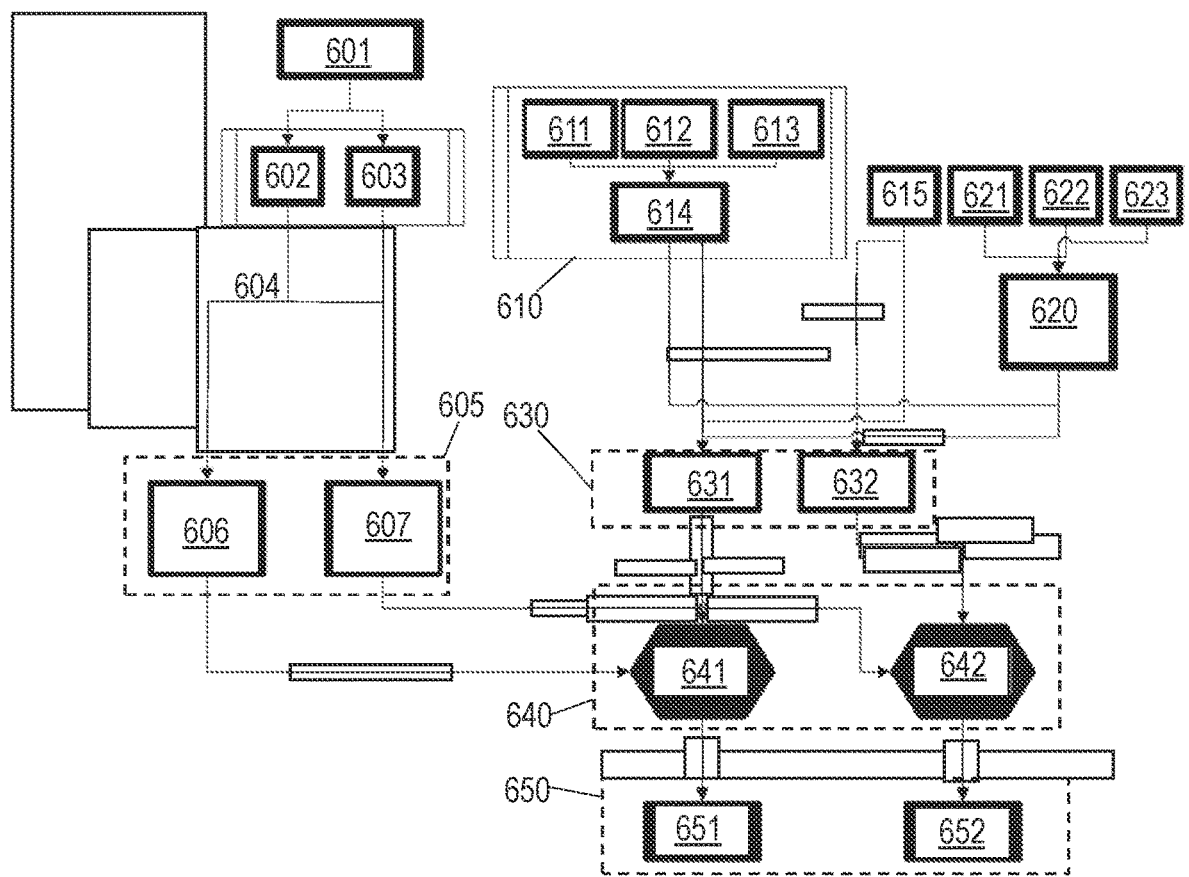
FIG. 6 illustrates an example scenario of exemplary embodiments herein.

FIG. 6 illustrates a flowchart showing steps, e.g., performed in the brake ECU 802, in a method for braking one or more trailers 3 in the tractor-trailer combination 1 according to an example.

The method may be adapted to be performed via the system 800. At step 602, whether a trailer is attached to a tractor, e.g., and a number of trailers in the one or more trailers 3, is detected and this information is transmitted to the brake ECU 802.

Step 602 may be performed based on PLC communication 601, e.g., as in action 304 above.

If a trailer is detected then, at step 604, whether more than one trailers are attached is determined and this information is transmitted to the brake ECU 802. Any existing trailer detection algorithm may be used to estimate the number of trailers connected.

At step 603, a powerline communication (PLC) is provided, e.g., as in action 304. This PLC may include information regarding whether the one or more trailers 3 have ABS and whether the ABS is being operated, e.g., a frequency of operation. This information is transmitted to the brake ECU 802. In other words at step 603, whether or not the trailers in the one or more trailers 3 have ABS present, is detected and this information is transmitted to the brake ECU 802.

Using the information from steps 602, 603, and 604, the brake ECU 802 may include one or more datamaps 606, 607 that output, as seen at step 605, a maximum no pulse threshold, and a maximum pulse frequency permitted, e.g., as illustrated in FIG. 3. The one or more datamaps 606, 607 may correspond to the first datamap and second datamap of actions 305-306.

The maximum no pulse threshold may be a maximum pressure that can be applied prior to pulsing, e.g., the maximum allowed brake pressure, e.g., as established in action 305.

The maximum no pulse threshold may be output by the datamap 607.

The maximum pulse frequency permitted may be most pulses and maximum length of time for brake application and minimum length of time for brake release. The maximum pulse frequency permitted may be the maximum allowed pulse established in action 306.

The maximum pulse frequency permitted may be output by the datamap 606.

The one or more datamaps 606, 607 of step 605 may have been prepared beforehand such that, for X number of trailers and depending on whether the trailers have ABS or not the trailer or trailers can consistently be braked without pulsing until a particular pressure, e.g., 3 Bar, and above which pulsing of the brake will occur at a particular rate, such as at 0.5 sec. of brake application with 1 second of no brake application. This one or more datamap will ensure that the trailer or trailers in the particular configuration of tractor-trailer will be stable but will not provide excessively conservative braking.

At step 610, a load of the one or more trailers 3 may be measured or estimated, e.g., as in action 303, and this information may then be transmitted to the brake ECU 802. The load may be measured or estimated 614 by any one or more out of:
- measuring or estimating 611 one or more drive axle loads, e.g., of the tractor-trailer combination 1 and/or of the tractor 2,
- measuring or estimating 612 a vehicle load, e.g., of the tractor-trailer combination 1 and/or of the tractor 2, and
- measuring or estimating 613 an inclination in the driving direction of the tractor-trailer combination 1.

At step 615, speed of the tractor-trailer combination 1 may be determined, e.g., as in action 302, and this information is transmitted to the brake ECU 802. The speed of the tractor-trailer combination 1 may be determined e.g., by using a speedometer in the tractor 2.

At step 620, an understeer or oversteer gradient for the tractor-trailer 1 combination is determined, e.g., as in action 303, based on, e.g., steering wheel angle 621, lateral acceleration 622, and yaw rate 623, and this information is transmitted to the brake ECU 802.

By testing or modeling, the brake ECU 802 may include a third datamap 631 of a maximum continuous brake pressure, e.g., a threshold brake pressure, for the trailer brakes 10 that can be continuously applied over a range of braking parameters without causing the wheels to lock up or the one or more trailers 3 to lose stability is established. The range of braking parameters may be e.g., the load of the one or more trailers 3, e.g., as step 610 and/or action 303, the speed of the tractor-trailer combination 1, e.g., as in step 615 and/or action 302, and the understeer or oversteer gradient for the tractor-trailer combination 1, e.g., as in step 620 and/or action 303.

Also by testing or modeling, the brake ECU 802 may include a fourth datamap 632 of an on-off cycling frequency for pulsing of the trailer brakes 10 of the one or more trailers 3 of the tractor-trailer combination 1 at brake pressures above the maximum continuous brake pressure over the range of braking parameters without causing the wheels to lock up or the one or more trailers 3 to lose stability is established. The range of braking parameters may be e.g., the load of the one or more trailers 3, e.g., as step 610 and/or action 303, the speed of the tractor-trailer combination 1, e.g., as in step 615 and/or action 302, and the understeer or oversteer gradient for the tractor-trailer combination 1, e.g., as in step 620 and/or action 303.

As part of a step 630, the information third datamap 631 outputs a maximum continuous brake pressure, and the information fourth datamap 632 outputs an on-off cycling frequency, e.g., a maximum cycling frequency.

The trailer brakes 10 of the one or more trailers 3 may then be continuously applied at brake pressures up to the established maximum continuous brake pressure and by pulsing according to the established on-off cycling frequency at brake pressures above the established maximum continuous brake pressure based on the measured or estimated load of the one or more trailers 3, the measured speed of the tractor-trailer combination 1, and the determined understeer or oversteer gradient for the tractor-trailer combination.

The maximum continuous brake pressure for the trailer brakes 10 of the one or more trailers 3, the length of an on cycle of the established on-off cycling frequency for pulsing of the brakes, and/or the length of an off cycle of the established on-off cycling frequency for pulsing of the trailer brakes 10 of the one or more trailers 3 may further be established in response to whether the PLC communication indicates that ABS braking is present on the one or more trailers 3, e.g., from step 603, and/or as a function of the number trailers attached to the tractor 2, e.g., from step 604. For example, the established maximum continuous brake pressure and the established on-off cycling frequency at brake pressures above the established maximum continuous brake pressure may be calculated/determined based on the measured or estimated load of a single trailer that is supplied with ABS. The presence of a second or more trailer and/or the absence of an ABS system may affect the established values and the confidence in the ability of the brakes to stop the tractor-trailer combination 1. For example, if the established maximum continuous brake pressure is 4 bar and the established on-off cycling frequency at brake pressures above the established maximum continuous brake pressure is 0.5 seconds braking and 1.0 seconds no braking calculated based on the measured or estimated load of a single trailer supplied with ABS, if a second trailer is present, the parameters may need to be adjusted to, e.g., 80% of the originally calculated brake pressure/cycling, e.g., 3.2 bar and 0.4 seconds braking. If, in addition, no ABS is provided, the parameters may need to be adjusted to, say 50% of the originally calculated numbers, say 2 bar and 0.25 seconds braking.

The input of the information from the datamaps 606, 607 from step 605 and the information from the datamaps 631, 632 at step 630 establishes saturation values of maximum constant pressure and maximum cycling frequency for the particular configuration and produces, at step 640, a saturated maximum continuous brake pressure 641 and a saturated on-off cycling frequency 642 for the trailer brakes 10 of the tractor-trailer combination 1.

In a step 650 the saturated maximum continuous brake pressure 641 and the saturated on-off cycling frequency 642 may be sent to the brake ECU 802 to be used for defining and/or limiting a brake pressure 651 and an on-off cycling frequency 652, e.g., as requested by a brake request, such as an XBR request, e.g., as applied in action 307.

The exemplary embodiments herein may also involve a machine learning function. Particularly, the maximum allowed brake pressure for the brakes of the one or more trailers 3 and/or the maximum allowed pulse may be changed in response to whether the PLC communication indicates that ABS braking has occurred during a braking operation, and/or as a function of the number trailers attached to the tractor 2. The maximum allowed pulse may for example change, based on the machine learning function, the duration and/or length of an on cycle of the established on-off cycling frequency for pulsing of the brakes, and/or a duration or length of an off cycle of the established on-off cycling frequency.

Changing maximum allowed brake pressure for the brakes of the one or more trailers 3 and/or the maximum allowed pulse may mean to establish them respectively in a different manner, or dynamically, e.g., based on the PLC communication.

The brake ECU 802 may be configured to make incremental adjustments up or down to the maximum continuous brake pressure for the brakes of the one or more trailers 3, the length of an on cycle of the established on-off cycling frequency for pulsing of the brakes, and/or the length of an off cycle of the established on-off cycling frequency in response to inputs such as whether the ABS is applied during a braking operation, or whether a trailer is added or removed from the tractor-trailer combination 1.

The incremental adjustments may be part of establishing any one or more out of: the maximum continuous brake pressure, the maximum allowed brake pressure, the on-off cycling frequency, and the maximum allowed pulse.

As one example (A), the established maximum continuous brake pressure or the maximum allowed brake pressure for the trailer brakes 10 of the one or more trailers 3 may be changed as a function of operation of the ABS for the trailer brakes 10 of the one or more trailers 3 during application of the brakes of the one or more trailers 3. For example, if the ABS does not operate, then that means that the maximum continuous brake pressure or the maximum allowed brake pressure may be increased. If the ABS does operate, then that may mean that the maximum continuous brake pressure or the maximum allowed brake pressure should be decreased. The brake ECU 802 may be configured to make incremental adjustments up or down.

In addition to (A) or alternatively, (B) a length of an on cycle of the established on-off cycling frequency or the maximum allowed pulse for pulsing of the trailer brakes 10 of the one or more trailers 3 may be changed as the function of operation of the anti-lock braking system for the trailer brakes 10 of the one or more trailers 3 during application of the trailer brakes 10 of the one or more trailers 3. For example, if the ABS does not operate, then that means that the length of time that the trailer brakes 10 can be applied, i.e., an on-state duration, may be increased, e.g. for the trailer which does not have ABS.

If the ABS does operate, then that may mean that the length of time that the brake can be applied should be decreased. The brake ECU 802 may be configured to make incremental adjustments up or down, e.g., as part of establishing the maximum continuous brake pressure or the maximum allowed brake pressure in action 305, and/or as part of establishing the on-off cycling frequency or the maximum allowed pulse in action 306.

In addition to (A) and/or (B) or alternatively, (C) a length of an off cycle of the established on-off cycling frequency or the maximum allowed pulse for pulsing of the trailer brakes 10 of the one or more trailers 3 can be changed, e.g., as part of action 306, as the function of operation of the anti-lock braking system for the trailer brakes 10 of the one or more trailers 3 during application of the trailer brakes 10 of the one or more trailers 3. For example, if the ABS does not operate, then that means that the length of time that the brake can be released can be decreased. If the ABS does operate, then that may mean that the length of time that the brake can be released should be increased. The brake ECU 802 may be configured to make incremental adjustments up or down, e.g., as part of establishing the maximum continuous brake pressure or the maximum allowed brake pressure in action 305, and/or as part of establishing the on-off cycling frequency or the maximum allowed pulse in action 306.

In addition to (A) and/or (B) and/or (C) or alternatively, (D) the established maximum continuous brake pressure or the maximum allowed brake pressure for the trailer brakes 10 of the one or more trailers 3 may be changed, e.g., as part of action 305, as a function of a number of trailers in the tractor-trailer combination 1. For example, if more than one trailer is present in the tractor-trailer combination 1, it may be desirable to decrease the maximum continuous brake pressure or the maximum allowed brake pressure for the trailer brakes 10 of the one or more trailers 3. The brake ECU 802 may be configured to make incremental adjustments up or down, e.g., as part of establishing the maximum continuous brake pressure or the maximum allowed brake pressure in action 305, and/or as part of establishing the on-off cycling frequency or the maximum allowed pulse in action 306.

In addition to (A) and/or (B) and/or (C) and/or (D) or alternatively, (E) the length of an on cycle of the established on-off cycling frequency or the maximum allowed pulse for pulsing of the trailer brakes 10 of the one or more trailers 3 may be changed, e.g., as part of action 306, as the function of the number of trailers in the tractor-trailer combination 1. For example, if only one trailer is present, it may be possible to increase the length of an on cycle, or the cycle might be set to a maximum. The brake ECU 802 may be configured to make incremental adjustments up or down, e.g., as part of establishing the maximum continuous brake pressure or the maximum allowed brake pressure in action 305, and/or as part of establishing the on-off cycling frequency or the maximum allowed pulse in action 306.

In addition to (A) and/or (B) and/or (C) and/or (D) and/or (E), (F) the length of an off cycle of the established on-off cycling frequency or the maximum allowed pulse for pulsing of the trailer brakes 10 of the one or more trailers 3 can be changed e.g., as part of action 306, as the function of the number of trailers in the tractor-trailer combination 1. For example, if more than one trailer is present in the tractor-trailer combination 1, it may be desirable to decrease the length of an off cycle of the established on-off cycling frequency for pulsing of the trailer brakes 10 of the one or more trailers 3. The brake ECU 802 may be configured to make incremental adjustments up or down, e.g., as part of establishing the maximum continuous brake pressure or the maximum allowed brake pressure in action 305, and/or as part of establishing the on-off cycling frequency or the maximum allowed pulse in action 306.

In the system 800, e.g., for braking one or more trailers 3 in a tractor-trailer combination 1, the brake ECU 802 may be provided. The brake ECU 802 may comprise a database containing a maximum continuous brake pressure established for trailer brakes 10 of wheels 11 of the one or more trailers 3 of the tractor-trailer combination 1 that can be continuously applied over a range of braking parameters without causing the wheels to lock up or the one or more trailers 3 to lose stability, and an on-off cycling frequency established for pulsing of the trailer brakes 10 of the one or more trailers 3 of the tractor-trailer combination 1 at brake pressures above the maximum continuous brake pressure over the range of braking parameters without causing the wheels to lock up or the one or more trailers 3 to lose stability. The range of braking parameters includes load of the one or more trailers 3, speed of the tractor-trailer combination 1, and an understeer or oversteer gradient for the tractor-trailer combination 1, e.g., as in actions 301-303. Means is provided for measuring or estimating a load of the one or more trailers 3, such as via measurement of a drive axle load, measurement of a vehicle load, and measurement of an inclination of the one or more trailers 3. Means such as a speedometer for measuring speed of the tractor-trailer combination 1 is also provided. Means is provided for determining an understeer or oversteer gradient for the tractor-trailer combination 1 using devices such as sensors for steering wheel angle, lateral acceleration, and yaw rate.

The system 800 may further include the one or more respective trailer brakes 10 of the one or more trailers 3 (which will ordinarily be connected to a source of pneumatic pressure via tractor solenoids 406 and trailer solenoids 407 of FIG. 4. The brake ECU 802 may be arranged to control application of the trailer brakes 10 of the one or more trailers 3 continuously at brake pressures up to the established maximum continuous brake pressure and by pulsing according to the established on-off cycling frequency at brake pressures above the established maximum continuous brake pressure based on the measured or estimated load of the one or more trailers 3, the measured speed of the tractor-trailer combination 1, and the determined understeer or oversteer gradient for the tractor-trailer combination 1.

The brake ECU 802 may, in addition, be arranged to establish the maximum continuous brake pressure for the trailer brakes 10 of the one or more trailers 3, the length of an on cycle of the established on-off cycling frequency for pulsing of the brakes, and/or the length of an off cycle of the established on-off cycling frequency for pulsing of the trailer brakes 10 of the one or more trailers 3 in response to whether the PLC communication indicates that ABS braking is present on the trailers, e.g., from step 603 or action 304, and/or as a function of the number of trailers attached to a tractor, e.g., from step 602, 604 or action 304. For example, the established maximum continuous brake pressure and the established on-off cycling frequency at brake pressures above the established maximum continuous brake pressure may be calculated based on the measured or estimated load of a single trailer that is supplied with ABS. The presence of a second (or more) trailer and/or the absence of an ABS system may affect the established values and the confidence in the ability of the brakes to stop the tractor-trailer combination 1. For example, if the established maximum continuous brake pressure is 4 bar and the established on-off cycling frequency at brake pressures above the established maximum continuous brake pressure is 0.5 seconds braking and 1.0 seconds no braking calculated based on the measured or estimated load of a single trailer supplied with ABS, if a second trailer is present, the numbers may need to be adjusted to, say 80% of the originally calculated numbers, say 3.2 bar and 0.4 seconds braking. If, in addition, no ABS is provided, the numbers may need to be adjusted to, say 50% of the originally calculated numbers, say 2 bar and 0.25 seconds braking. The input of the information from step 605 and the information from step 630 establishes saturation values of maximum constant pressure and maximum cycling frequency for the particular configuration and produces. In other words, the maximum continuous brake pressure may be limited to the maximum allowed brake pressure, both established in action 305, and/or the on-off cycling frequency may be limited by the maximum allowed pulse, both established in action 306.

At step 650, the saturated maximum continuous brake pressure and established on-off cycling frequency may be used for the trailer brakes 10 of the tractor-trailer combination 1.

The system 800 may comprise a machine learning function. Particularly, the maximum continuous brake pressure or the maximum allowed brake pressure for the trailer brakes 10 of the one or more trailers 3, the length of an on cycle of the established on-off cycling frequency or maximum allowed pulse for pulsing of the brakes, and/or the length of an off cycle of the established on-off cycling frequency for pulsing of the trailer brakes 10 of the one or more trailers 3 may be changed, e.g., as part of actions 305-306, in response to whether the PLC communication indicates that ABS braking has occurred during a braking operation, and/or as a function of the number trailers attached to the tractor 2. The brake ECU 802 may be configured to make incremental adjustments up or down to the maximum continuous brake pressure or the maximum allowed brake pressure for the trailer brakes 10 of the one or more trailers 3, the length of an on cycle of the established on-off cycling frequency or the maximum allowed pulse for pulsing of the brakes, and/or the length of an off cycle of the established on-off cycling frequency in response to inputs such as whether the ABS is applied during a braking operation, or whether a trailer is added or removed from the tractor-trailer combination 1, e.g., as part of actions 305-306.

The system 800 may further comprise an ABS for the trailer brakes 10 of the one or more trailers 3, and the brake ECU 802 may be arranged to change, e.g., as part of actions 305-306, the established maximum continuous brake pressure or the maximum allowed brake pressure for the trailer brakes 10 of the one or more trailers 3 as a function of operation of the ABS for the trailer brakes 10 of the one or more trailers 3 during application of the trailer brakes of the one or more trailers 3, and/or to increase a length of an on cycle of the established on-off cycling frequency or the maximum allowed pulse for pulsing of the trailer brakes 10 of the one or more trailers 3 as a function of operation of an anti-lock braking system for the trailer brakes 10 of the one or more trailers 3 during application of the trailer brakes 10 of the one or more trailers 3, and/or to decrease a length of an off cycle of the established on-off cycling frequency or the maximum allowed pulse for pulsing of the trailer brakes 10 of the one or more trailers 3 as a function of operation of an anti-lock braking system for the trailer brakes 10 of the one or more trailers 3 during application of the trailer brakes 10 of the one or more trailers 3, and/or to change the established maximum continuous brake pressure or the maximum allowed brake pressure for the trailer brakes 10 of the one or more trailers 3 as a function of a number of trailers in the tractor-trailer combination 1, and/or to increase a length of the on cycle of the established on-off cycling frequency or the maximum allowed pulse for pulsing of the trailer brakes 10 of the one or more trailers 3 as the function of the number of trailers in the tractor-trailer combination 1, and/or to decrease a length of the off cycle of the established on-off cycling frequency or the maximum allowed pulse for pulsing of the trailer brakes 10 of the one or more trailers 3 as the function of the number of trailers in the tractor-trailer combination 1.

Figure 7:
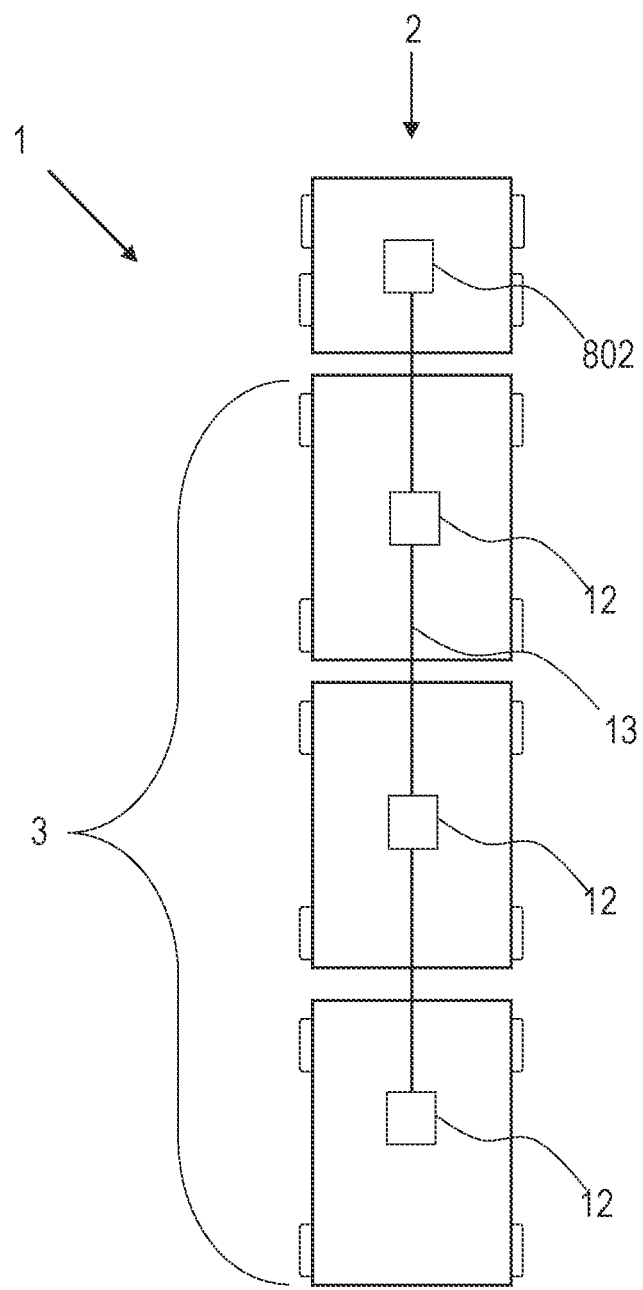
FIG. 7 illustrates an example scenario of exemplary embodiments herein.

FIG. 7 illustrates an example scenario of embodiments herein.

In the example scenario, the tractor-trailer combination 1 comprises three trailers in the one or more trailers 3. The brake ECU 802 is in the example scenario comprised in the tractor 2. The brake ECU 802 and the brake control units 12 communicates over the powerline 13. To estimate the number of trailers in the one or more trailers 3, e.g., as in action 304, the brake ECU 802 may use a machine learning model. The machine learning model may be trained using an intensity of PLC communication for different number of trailers. In this way, the machine learning model may map an intensity of PLC traffic to the number of trailer in the one or more trailers 3.

The machine learning model may have been trained at a previous time using all applicable combination of trailers with their communication over a powerline such as the powerline 13.

The brake ECU 802 may also utilize the machine learning model to estimate how many and/or which trailers in the one or more trailer 3 have ABS, e.g., trained at a previous time with all applicable and/or suitable combination of trailers communicating ABS signals over the powerline 13.

The machine learning model may, e.g., as part of action 304, estimate a confidence in its above-mentioned estimations. Establishing the maximum continuous brake pressure or the maximum allowed brake pressure, and/or establishing the on-off cycling frequency or the maximum allowed pulse, e.g., in action 305-306, may further be based on the estimated confidence.

Figure 8:
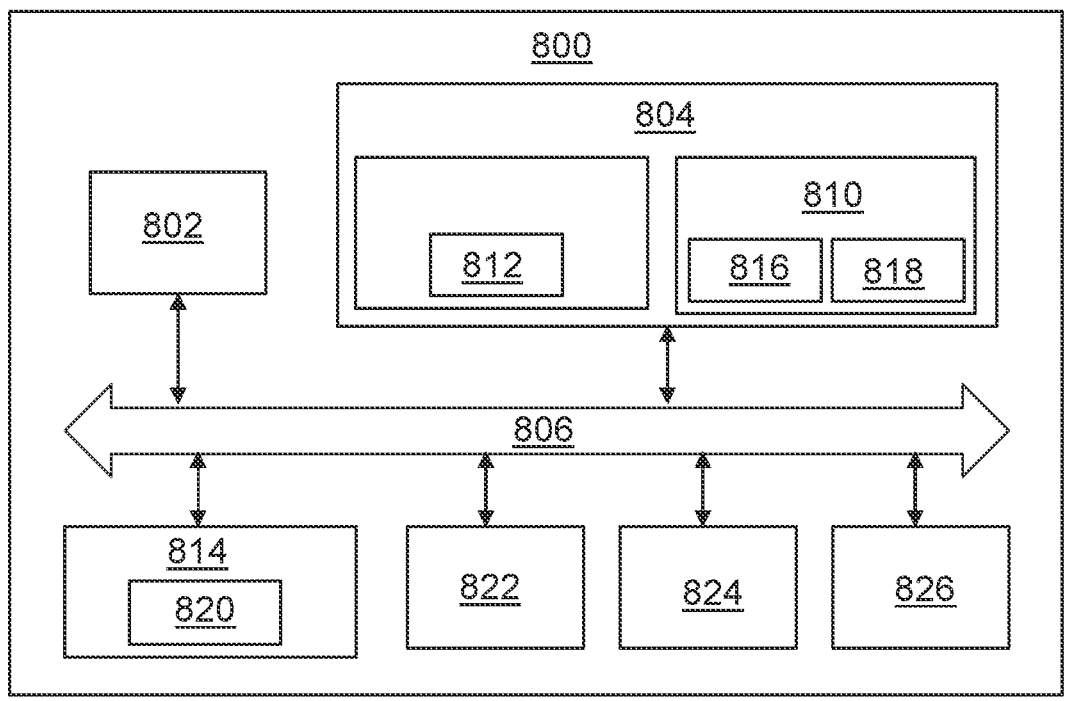
FIG. 8 illustrates an example diagram of a system according to one example.

FIG. 8 is a schematic diagram of the system 800 for implementing examples disclosed herein. The system 800 may be a computer system or a control system, or comprise any one or both thereof. The system 800 is adapted to execute instructions from a computer-readable medium to perform these and/or any of the functions or processing described herein. The system 800 may be connected (e.g., networked) to other machines in a LAN, an intranet, an extranet, or the Internet. While only a single device is illustrated, the system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The system 800 may comprise at least one computing device or electronic device capable of including firmware, hardware, and/or executing software instructions to implement the functionality described herein. The system 800 may include the brake ECU 802 (may also be referred to as a control unit or a processor device), a memory 804, and a system bus 806. The system 800 may include at least one computing device having the brake ECU 802. The system bus 806 provides an interface for system components including, but not limited to, the memory 804 and the brake ECU 802. The brake ECU 802 may include any number of hardware components for conducting data or signal processing or for executing computer code stored in memory 804. The brake ECU 802 (e.g., control unit or processor device) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The brake ECU 802 may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the brake ECU 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with an ECU, such as the brake ECU 802. A basic input/output system (BIOS) 812 may be stored in the non-volatile memory 808 and can include the basic routines that help to transfer information between elements within the system 800.

The system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like. The storage device 814 may represent or may comprise the database of the system 800 described with respect to FIG. 1.

A number of modules can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program product 820 stored on a transitory or non-transitory computer-usable or computer-readable storage medium (e.g., single medium or multiple media), such as the storage device 814, which includes complex programming instructions (e.g., complex computer-readable program code) to cause the brake ECU 802 to carry out the steps described herein. Thus, the computer-readable program code can comprise software instructions for implementing the functionality of the examples described herein when executed by the brake ECU 802. The brake ECU 802 may serve as a controller or control system for the system 800 that is to implement the functionality described herein.

The system 800 also may include an input device interface 822 (e.g., input device interface and/or output device interface). The input device interface 822 may be configured to receive input and selections to be communicated to the system 800 when executing instructions, such as from a keyboard, mouse, touch-sensitive surface, etc. Such input devices may be connected to the brake ECU 802 through the input device interface 822 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The system 800 may include an output device interface 824 configured to forward output, such as to a display, a video display unit (e.g., a liquid crystal display (LCD) or a cathode ray tube (CRT)). The system 800 may also include a communications interface 826 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Below follow some brief examples of further embodiments herein, any one or more of the examples may be combined with any one or more out of the examples and embodiments described above.

Example 1. A method for braking one or more trailers 3 in a tractor-trailer combination 1, comprising: establishing a maximum continuous brake pressure for trailer brakes 10 of wheels the one or more trailers 3 of the tractor-trailer combination 1 that can be continuously applied over a range of braking parameters without causing the wheels to lock up or the one or more trailers to lose stability;
  establishing an on-off cycling frequency for pulsing of the trailer brakes 10 of the one or more trailers of the tractor-trailer combination 1 at brake pressures above the maximum continuous brake pressure over the range of braking parameters without causing the wheels to lock up or the one or more trailers to lose stability;
  wherein the range of braking parameters includes load of the one or more trailers, speed of the tractor-trailer combination 1, and an understeer or oversteer gradient for the tractor-trailer combination 1;
  measuring or estimating a load of the one or more trailers;
  measuring speed of the tractor-trailer combination 1;
  determining an understeer or oversteer gradient for the tractor-trailer combination 1; and
  applying the trailer brakes 10 of the one or more trailers continuously at brake pressures up to the established maximum continuous brake pressure and by pulsing according to the established on-off cycling frequency at brake pressures above the established maximum continuous brake pressure based on the measured or estimated load of the one or more trailers, the measured speed of the tractor-trailer combination 1, and the determined understeer or oversteer gradient for the tractor-trailer combination 1.

Example 2. The method as set furth in Example 1, changing the established maximum continuous brake pressure for the trailer brakes 10 of the one or more trailers as a f1.mction of operation of an anti-lock braking system for the trailer brakes 10 of the one or more trailers during application of the trailer brakes 10 of the one or more trailers.

Example 3. The method as set forth in Example 2, increasing a length of an on cycle of the established on-off cycling frequency for pulsing of the trailer brakes 10 of the one or more trailers as the function of operation of the anti-lock braking system for the trailer brakes 10 of the one or more trailers during application of the trailer brakes 10 of the one or more trailers.

Example 4. The method as set forth in Example 3, decreasing a length of an off cycle of the established on-off cycling frequency for pulsing of the trailer brakes 10 of the one or more trailers as the function of operation of the anti-lock braking system for the trailer brakes 10 of the one or more trailers during application of the trailer brakes 10 of the one or more trailers.

Example 5. The method as set f01ih in Example 2, decreasing a length of an off cycle of the established on-off cycling frequency for pulsing of the trailer brakes 10 of the one or more trailers as the function of operation of the anti-lock braking system for the trailer brakes 10 of the one or more trailers during application of the trailer brakes 10 of the one or more trailers.

Example 6. The method as set forth in Example 1, increasing a length of an on cycle of the established on-off cycling frequency for pulsing of the trailer brakes 10 of the one or more trailers as a function of operation of an anti-lock braking system for the trailer brakes 10 of the one or more trailers during application of the trailer brakes 10 of the one or more trailers.

Example 7. The method as set forth in Example 1, decreasing a length of an off cycle of the established on-off cycling frequency for pulsing of the trailer brakes 10 of the one or more trailers as a function of operation of an anti-lock braking system for the trailer brakes 10 of the one or more trailers during application of the trailer brakes 10 of the one or more trailers.

Example 8. The method as set forth in Example 1, changing the established maximum continuous brake pressure for the trailer brakes 10 of the one or more trailers as a function of a number of trailers in the tractor-trailer combination 1.

Example 9. The method as set forth in Example 8, increasing a length of an on cycle of the established on-off cycling frequency for pulsing of the trailer brakes 10 of the one or more trailers as the function of the number of trailers in the tractor-trailer combination 1.

Example 10. The method as set forth in Example 9, decreasing a length of an off cycle of the established on-off cycling frequency for pulsing of the trailer brakes 10 of the one or more trailers as the function of the number of trailers in the tractor-trailer combination 1.

Example 11. The method as set forth in Example 8, decreasing a length of an off cycle of the established on-off cycling frequency for pulsing of the trailer brakes 10 of the one or more trailers as the function of the number of trailers in the tractor-trailer combination 1.

Example 12. The method as set forth in Example 1, increasing a length of an on cycle of the established on-off cycling frequency for pulsing of the trailer brakes 10 of the one or more trailers as a function of operation of a number of trailers in the tractor-trailer combination 1.

Example 13. The method as set forth in Example 1, decreasing a length of an off cycle of the established on-off cycling frequency for pulsing of the trailer brakes 10 of the one or more trailers as a function of operation of a number of trailers in the tractor-trailer combination 1.

Example 14. The system 800 for braking one or more trailers in a tractor-trailer combination 1, comprising: the brake ECU 802 comprising a database containing a maximum continuous brake pressure established for trailer brakes 10 of wheels of the one or more trailers of the tractor-trailer combination 1 that can be continuously applied over a range of braking parameters without causing the wheels to lock up or the one or more trailers to lose stability, and an on-off cycling frequency established for pulsing of the trailer brakes 10 of the one or more trailers of the tractor-trailer combination 1 at brake pressures above the maximum continuous brake pressure over the range of braking parameters without causing the wheels to lock up or the one or more trailers to lose stability, wherein the range of braking parameters includes load of the one or more trailers, speed of the tractor-trailer combination 1, and an understeer or oversteer gradient for the tractor-trailer combination 1;
  means for measuring or estimating a load of the one or more trailers; means for measuring speed of the tractor-trailer combination 1;
  means for determining an understeer or oversteer gradient for the tractor-trailer combination 1; and
  trailer brakes 10 of the one or more trailers, wherein brake ECU 802 is arranged to control application of the trailer brakes 10 of the one or more trailers continuously at brake pressures up to the established maximum continuous brake pressure and by pulsing according to the established on-off cycling frequency at brake pressures above the established maximum continuous brake pressure based on the measured or estimated load of the one or more trailers, the measured speed of the tractor-trailer combination 1, and the determined understeer or oversteer gradient for the tractor-trailer combination 1.

Example 15. The system 800 as set forth in Example 14, further comprising an anti-lock braking system for the trailer brakes 10 of the one or more trailers, wherein the brake ECU 802 is arranged to change the established maximum continuous brake pressure for the trailer brakes 10 of the one or more trailers as a function of operation of the anti-lock braking system for the trailer brakes 10 of the one or more trailers during application of the trailer brakes 10 of the one or more trailers.

Example 16. The system 800 as set forth in Example 15, wherein the brake ECU 802 is arranged to increase a length of an on cycle of the established on-off cycling frequency for pulsing of the trailer brakes 10 of the one or more trailers 3 as the function of operation of the anti-lock braking system for the trailer brakes 10 of the one or more trailers 3 during application of the trailer brakes 10 of the one or more trailers 3.

Example 17. The system 800 as set forth in Example 16, wherein the brake ECU 802 is arranged to decrease a length of an off cycle of the established on-off cycling frequency for pulsing of the trailer brakes 10 of the one or more trailers 3 as the function of operation of the anti-lock braking system for the trailer brakes 10 of the one or more trailers 3 during application of the trailer brakes 10 of the one or more trailers 3.

Example 18. The system 800 as set forth in Example 15, wherein the brake ECU 802 is arranged decrease a length of an off cycle of the established on-off cycling frequency for pulsing of the trailer brakes 10 of the one or more trailers 3 as the function of operation of the anti-lock braking system for the trailer brakes 10 of the one or more trailers 3 during application of the trailer brakes 10 of the one or more trailers 3.

Example 19. The system 800 as set forth in Example 14, further comprising an anti-lock braking system for the trailer brakes 10 of the one or more trailers 3, wherein the brake ECU 802 is arranged to increase a length of an on cycle of the established on-off cycling frequency for pulsing of the trailer brakes 10 of the one or more trailers 3 as a function of operation of an anti-lock braking system for the trailer brakes 10 of the one or more trailers 3 during application of the trailer brakes 10 of the one or more trailers 3.

Example 20. The system 800 as set forth in Example 14, further comprising an ABS for the trailer brakes 10 of the one or more trailers 3, wherein the brake ECU 802 is arranged to decrease a length of an off cycle of the established on-off cycling frequency for pulsing of the trailer brakes 10 of the one or more trailers 3 as a function of operation of an anti-lock braking system for the trailer brakes 10 of the one or more trailers 3 during application of the trailer brakes 10 of the one or more trailers 3.

Example 21. The system 800 as set forth in Example 14, further comprising an anti-lock braking system for the trailer brakes 10 of the one or more trailers 3, wherein the brake ECU 802 is arranged to change the established maximum continuous brake pressure for the trailer brakes 10 of the one or more trailers 3 as a function of a number of trailers in the tractor-trailer combination 1.

Example 22. The system 800 as set forth in Example 21, wherein the brake ECU 802 is arranged to increase a length of an on cycle of the established on-off cycling frequency for pulsing of the trailer brakes 10 of the one or more trailers 3 as the function of the number of trailers in the tractor-trailer combination.

Example 23. The system 800 as set forth in Example 22, wherein the brake ECU 802 is arranged to decrease a length of an off cycle of the established on-off cycling frequency for pulsing of the trailer brakes 10 of the one or more trailers 3 as the function of the number of trailers in the tractor-trailer combination.

Example 24. The system 800 as set forth in Example 21, wherein the brake ECU 802 is arranged to decrease a length of an off cycle of the established on-off cycling frequency for pulsing of the trailer brakes 10 of the one or more trailers 3 as the function of the number of trailers in the tractor-trailer combination.

Example 25. The system 800 as set forth in Example 14, further comprising an anti-lock braking system for the trailer brakes 10 of the one or more trailers 3, wherein the brake ECU 802 is arranged to increase a length of an on cycle of the established on-off cycling frequency for pulsing of the trailer brakes 10 of the one or more trailers 3 as a function of operation of a number of trailers in the tractor-trailer combination 1.

Example 26. The system 800 as set forth in Example 14, further comprising an anti-lock braking system for the trailer brakes 10 of the one or more trailers 3, wherein the brake ECU 802 is arranged to decrease a length of an off cycle of the established on-off cycling frequency for pulsing of the trailer brakes 10 of the one or more trailers 3 as a function of operation of a number of trailers in the tractor-trailer combination 1.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

Change or changing as used herein may mean that values and/or parameters are initially established in a different manner based on the changed valued and/or parameters.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A method for braking one or more trailers in a tractor-trailer combination, comprising:
    measuring or estimating a load of the one or more trailers;
    measuring a speed of the tractor-trailer combination;
    determining an understeer or oversteer gradient for the tractor-trailer combination;
    establishing a maximum continuous brake pressure for trailer brakes of wheels of the one or more trailers of the tractor-trailer combination that can be continuously applied over a range of braking parameters without causing the wheels to lock up or the one or more trailers to lose stability, wherein the range of braking parameters includes the load of the one or more trailers, the speed of the tractor-trailer combination, and the understeer or oversteer gradient for the tractor-trailer combination;
    establishing an on-off cycling frequency for pulsing of the trailer brakes of the one or more trailers of the tractor-trailer combination at brake pressures above the maximum continuous brake pressure over the range of braking parameters without causing the wheels to lock up or the one or more trailers to lose stability; and
    applying the trailer brakes of the one or more trailers continuously at brake pressures up to the established maximum continuous brake pressure and by pulsing according to the established on-off cycling frequency at brake pressures above the established maximum continuous brake pressure.

2. The method of claim 1, wherein establishing the maximum continuous brake pressure and establishing the on-off cycling frequency is based on whether or not Anti-lock Braking System (ABS) is present or absent in the one or more trailers.

3. The method of claim 2, wherein whether or not ABS is present or absent in the one or more trailers is established using a Power Line Communication (PLC) with the one or more trailers.

4. The method of claim 1, wherein the maximum continuous brake pressure and/or the on-off cycling frequency are established as a function of a number of trailers in the one or more trailers.

5. The method of claim 4, wherein the method further comprises estimating the number of trailers in the one or more trailers based on obtained a plurality of PLC signals transmitted via PLC signalling from each one of the one or more trailers.

6. The method of claim 5, wherein the estimating is performed by using a machine learning model and the obtained plurality of PLC signals, wherein the machine learning model is trained on a plurality of different numbers of trailers signalling using PLC.

7. The method of claim 1, wherein establishing the maximum continuous brake pressure and establishing the on-off cycling frequency comprises producing the maximum continuous brake pressure and the on-off cycling frequency based on a maximum allowed brake pressure that can be applied prior to pulsing, and based on a maximum allowed pulse.

8. The method of claim 7, wherein the maximum allowed brake pressure and the maximum allowed pulse is established by the use of a datamap, wherein at least a number of trailers of the one or more trailers is used as input.

9. The method of claim 8, wherein the maximum allowed brake pressure and the maximum allowed pulse are further established based on whether the one or more trailers have ABS or not.

10. The method of claim 1, wherein the applying the trailer brakes of the one or more trailers continuously at brake pressures up to the established maximum continuous brake pressure and pulsing according to the established on-off cycling frequency at brake pressures above the established maximum continuous brake pressure are based on the measured or estimated load of the one or more trailers, the measured speed of the tractor-trailer combination, and the determined understeer or oversteer gradient for the tractor-trailer combination.

11. A system for braking one or more trailers in a tractor-trailer combination, comprising:
a brake electronic control unit comprising a database containing a maximum continuous brake pressure established for trailer brakes of wheels of the one or more trailers of the tractor-trailer combination that can be continuously applied over a range of braking parameters without causing the wheels to lock up or the one or more trailers to lose stability, and an on-off cycling frequency established for pulsing of the trailer brakes of the one or more trailers of the tractor-trailer combination at brake pressures above the maximum continuous brake pressure over the range of braking parameters without causing the wheels to lock up or the one or more trailers to lose stability, wherein the range of braking parameters includes load of the one or more trailers, speed of the tractor-trailer combination, and an understeer or oversteer gradient for the tractor-trailer combination;
means for measuring or estimating a load of the one or more trailers;
means for measuring speed of the tractor-trailer combination;
means for determining an understeer or oversteer gradient for the tractor-trailer combination; and
the trailer brakes of the one or more trailers,
wherein the brake electronic control unit is arranged to control application of the trailer brakes of the one or more trailers continuously at brake pressures up to the established maximum continuous brake pressure and by pulsing according to the established on-off cycling frequency at brake pressures above the established maximum continuous brake pressure.

12. The system of claim 11, wherein the system is configured to perform a method for braking one or more trailers in a tractor-trailer combination, comprising:
measuring or estimating a load of the one or more trailers;
measuring a speed of the tractor-trailer combination;
determining an understeer or oversteer gradient for the tractor-trailer combination;
establishing a maximum continuous brake pressure for trailer brakes of wheels of the one or more trailers of the tractor-trailer combination that can be continuously applied over a range of braking parameters without causing the wheels to lock up or the one or more trailers to lose stability, wherein the range of braking parameters includes the load of the one or more trailers, the speed of the tractor-trailer combination, and the understeer or oversteer gradient for the tractor-trailer combination;
establishing an on-off cycling frequency for pulsing of the trailer brakes of the one or more trailers of the tractor-trailer combination at brake pressures above the maximum continuous brake pressure over the range of braking parameters without causing the wheels to lock up or the one or more trailers to lose stability; and
applying the trailer brakes of the one or more trailers continuously at brake pressures up to the established maximum continuous brake pressure and by pulsing according to the established on-off cycling frequency at brake pressures above the established maximum continuous brake pressure.

13. A tractor-trailer combination comprising a system configured to perform the methods of claim 1.

14. A computer program product comprising program code for performing, when executed by the processor device, the method of claim 1.

15. A non-transitory computer-readable storage medium comprising instructions, which when executed by the processor device, cause the processor device to perform the method of claim 1.

* * * * *